(12) United States Patent
Liu

(10) Patent No.: US 7,383,835 B2
(45) Date of Patent: Jun. 10, 2008

(54) BARBECUE GRILL

(76) Inventor: George C. M. Liu, No. 96, Sec. 3, Yun-Ke Road, Dou-Liou City, Yunlin Hsien (TW)

( * ) Notice: Subject to any disclaimer, the term of this patent is extended or adjusted under 35 U.S.C. 154(b) by 314 days.

(21) Appl. No.: 11/340,903

(22) Filed: Jan. 27, 2006

(65) Prior Publication Data

US 2007/0175467 A1   Aug. 2, 2007

(51) Int. Cl.
F24C 15/00 (2006.01)
B65D 43/14 (2006.01)
A47J 37/00 (2006.01)

(52) U.S. Cl. ............... 126/25 R; 126/220; 126/194; 220/252; 220/810; 16/319

(58) Field of Classification Search ............ 126/25 R, 126/211, 214 R, 220, 190, 194, 37 B, 39 B, 126/37 A; 16/221, 229, 319, 342; 220/252, 220/810, 826
See application file for complete search history.

(56) References Cited

U.S. PATENT DOCUMENTS 2,250,729 A * 7/1941 Smith et al. ............ 220/252
3,229,846 A * 1/1966 Katz .................... 220/252
4,649,599 A * 3/1987 Beller .................... 16/319
4,996,969 A * 3/1991 Dodgen ................. 126/25 R
5,355,558 A * 10/1994 Vertanen ............... 126/25 R
5,755,154 A * 5/1998 Schroeter et al. ...... 126/25 R

FOREIGN PATENT DOCUMENTS

DE       27 04 421 B1 *   3/1978

* cited by examiner

*Primary Examiner*—Josiah C. Cocks

(57) ABSTRACT

A barbecue grill has a grill body, two hinge plates, a rear cover, a front cover and holding pins. The hinge plates are mounted on the grill body and respectively have a mounting foot and a mounting and adjustment panel. Each mounting and adjustment panel has a pivot hole and adjusting holes. The rear cover is connected pivotally to the hinge plates and has a curved panel, two side panels and two pivot pins. Each side panel has positioning holes. The pivot pins protrude out from the side panels and extend through the pivot holes. The front cover is mounted around the rear cover and has a curved panel, two side panels and two pivot collars. Each side panel has positioning holes. The pivot collars are protruded out the side panels and mounted around the pivot pins. The holding pins are extended through the adjusting holes and the positioning holes.

4 Claims, 4 Drawing Sheets

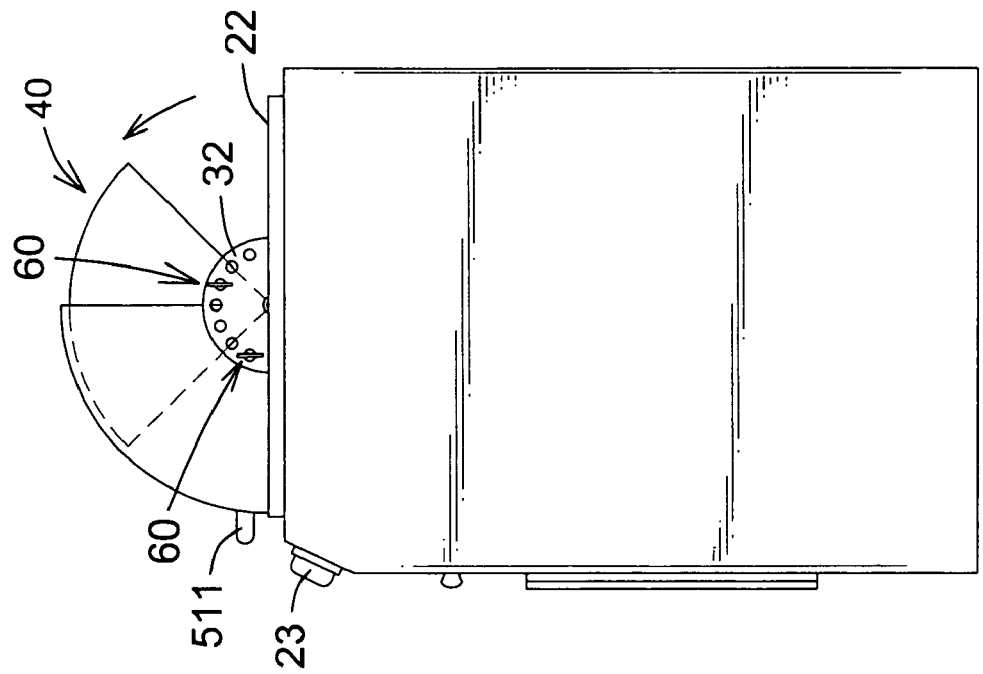
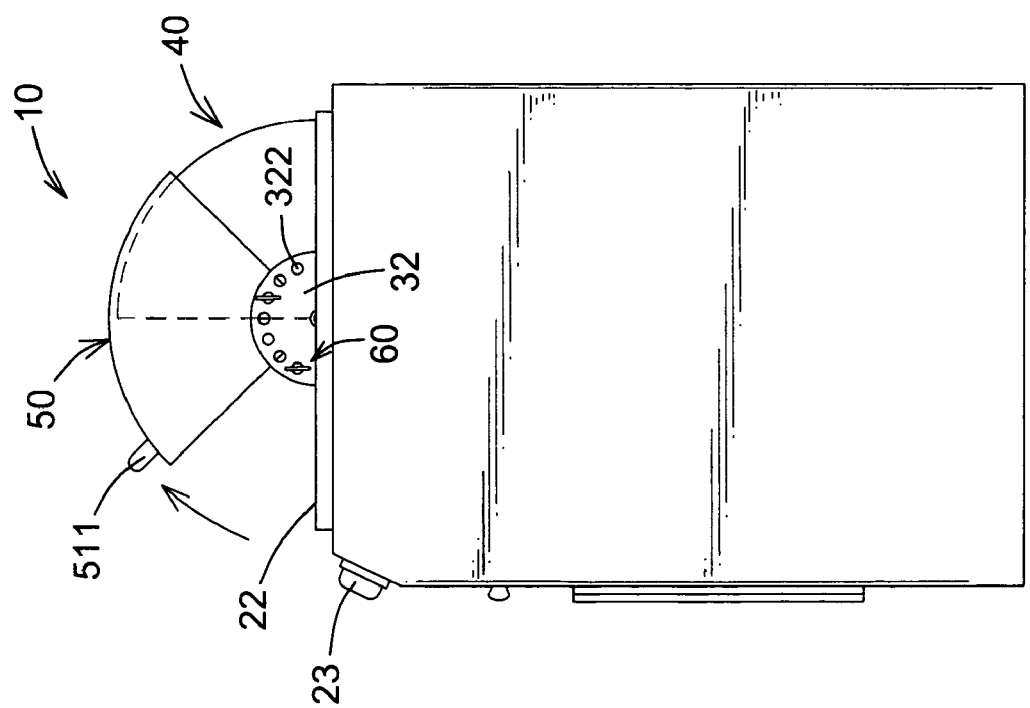
FIG. 3
FIG. 4

BARBECUE GRILL

BACKGROUND OF THE INVENTION

1. Field of the Invention

The present invention relates to a barbecue grill, and more particularly to a barbecue grill with two covers and can operate conveniently.

2. Description of Related Art

With reference to FIG. 5, a conventional barbecue grill (70) generally comprises a grill body (71), a frame (72), a spit (73) and a cover (74).

The grill body (71) has a top, a front, a rear, a burner (711), a grill (712) and a control panel (713). The burner (711) is mounted in the top of the grill body (71). The grill (712) is mounted on the top of the grill body (71) near the burner (711). The control panel (713) is mounted on the front of the grill body (71) near the top and controls the burner (711).

The frame (72) is mounted securely on the top of the grill body (71) around the burner (711) and has two through holes. The through holes are formed in the frame (72) and face each other. The spit (73) is mounted in the though holes in the frame (72) over the burner (711).

The cover (74) is pivotally mounted over the spit (73) and the burner (711), selectively covers the burner (711) and has a front, two sides, two elongated holes and a handle (741). The elongated holes are formed respectively in the sides of the cover (74), align with the through holes in the frame (72) and are mounted around the spit (73). The handle (741) is mounted on the front of the cover(74).

However, the barbecue grill (70) only has a cover (74), so users must stand in front of the grill body (71) to roast or grill food and cannot operate the barbecue grill (70) from the rear near the frame (72).

To overcome the shortcoming, the present invention provides a barbecue grill with two covers to obviate or mitigate the aforementioned problems.

SUMMARY OF THE INVENTION

The main objective of the present invention is to provide a barbecue grill that can be tended from multiple sides.

A barbecue grill in accordance with the present invention comprises a grill body, two hinge plates, a rear cover, a front cover and holding pins. The hinge plates are separately mounted on the grill body, and each hinge plate has a mounting foot and a mounting and adjustment panel. Each mounting and adjustment panel has a pivot hole and adjusting holes. The rear cover is connected pivotally to the hinge plates and has a curved panel, two side panels and two pivot pins. Each side panel has positioning holes. The pivot pins protrude out from the side panels and extend through the pivot holes. The front cover is mounted around the rear cover and has a curved panel, two side panels and two pivot collars. Each side panel has positioning holes. The pivot collars protrude out from the side panels and are mounted rotatably around the pivot pins. The holding pins extend through the adjusting holes and the positioning holes in the two covers.

Other objectives, advantages and novel features of the invention will become more apparent from the following detailed description when taken in conjunction with the accompanying drawings.

BRIEF DESCRIPTION OF THE DRAWINGS

FIG. 3 is an operational side view of the barbecue grill in FIG. 1 to be tended from the front;

FIG. 4 is an operational side view of the barbecue grill in FIG. 1 to be tended from the rear;

DETAILED DESCRIPTION OF THE PREFERRED EMBODIMENT

Figure 1:
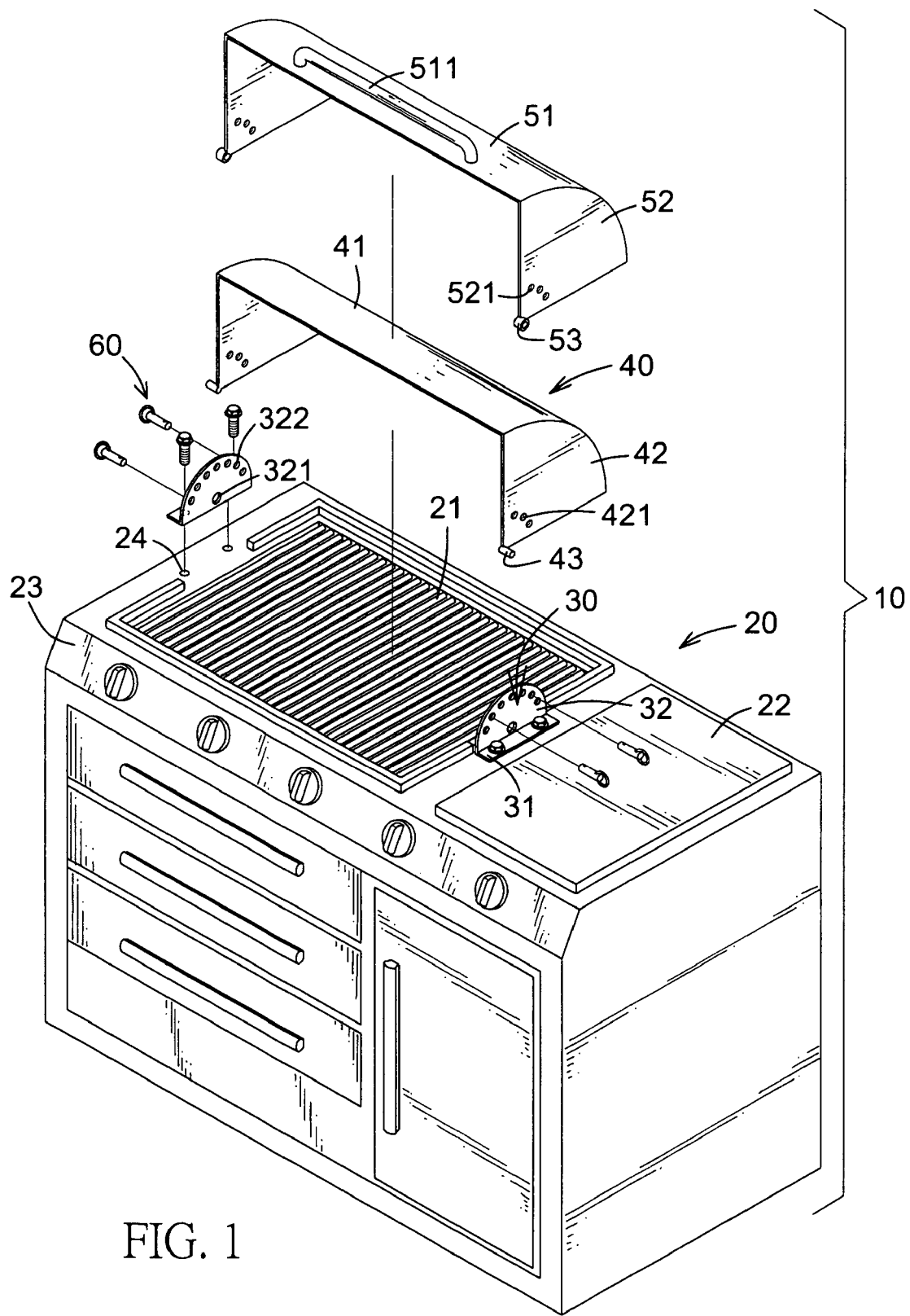
FIG. 1 is a partially exploded perspective view of a barbecue grill in accordance with the present invention.
Figure 2:
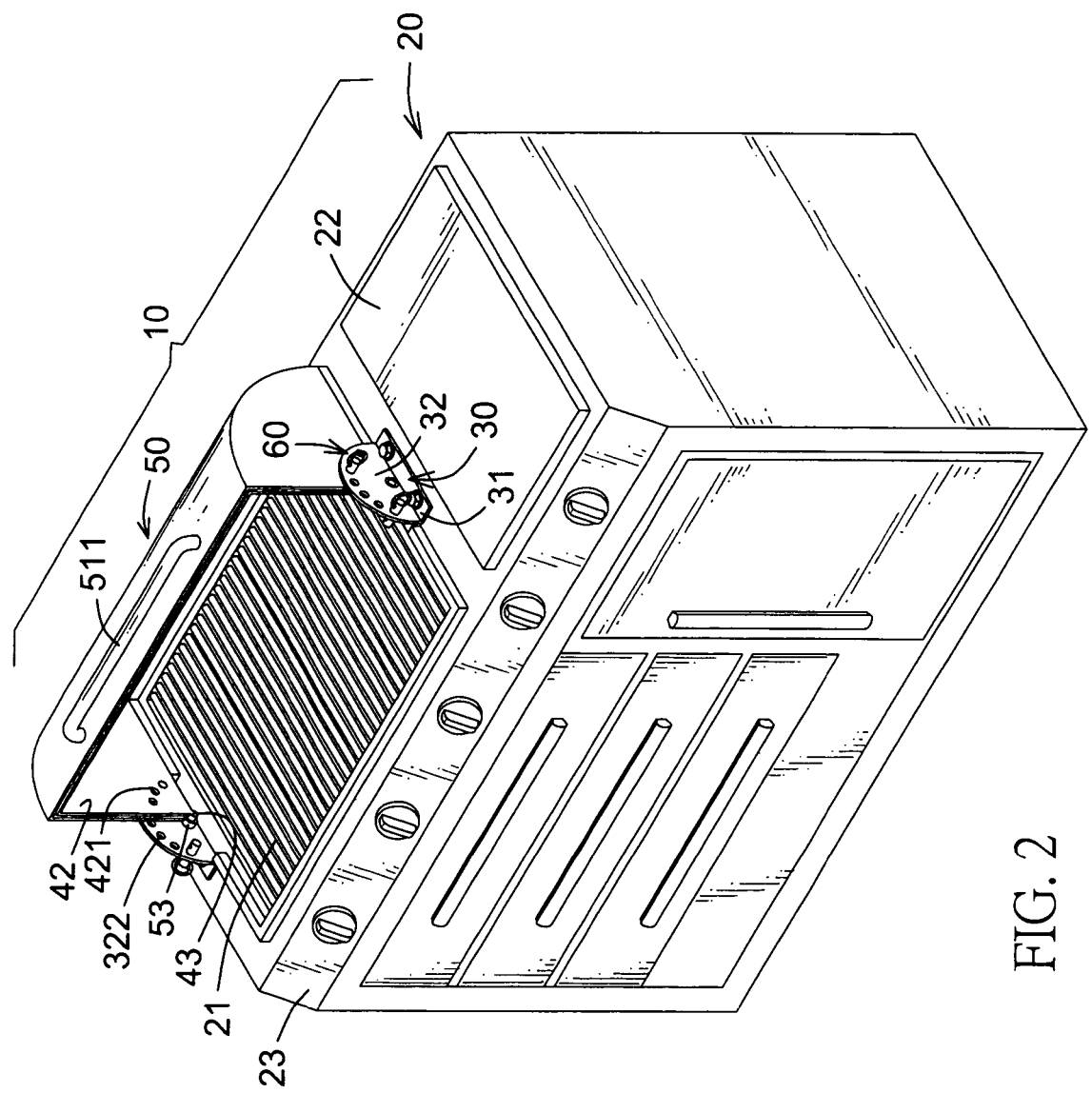
FIG. 2 is a perspective view of the barbecue grill in FIG. 1.
Figure 5:
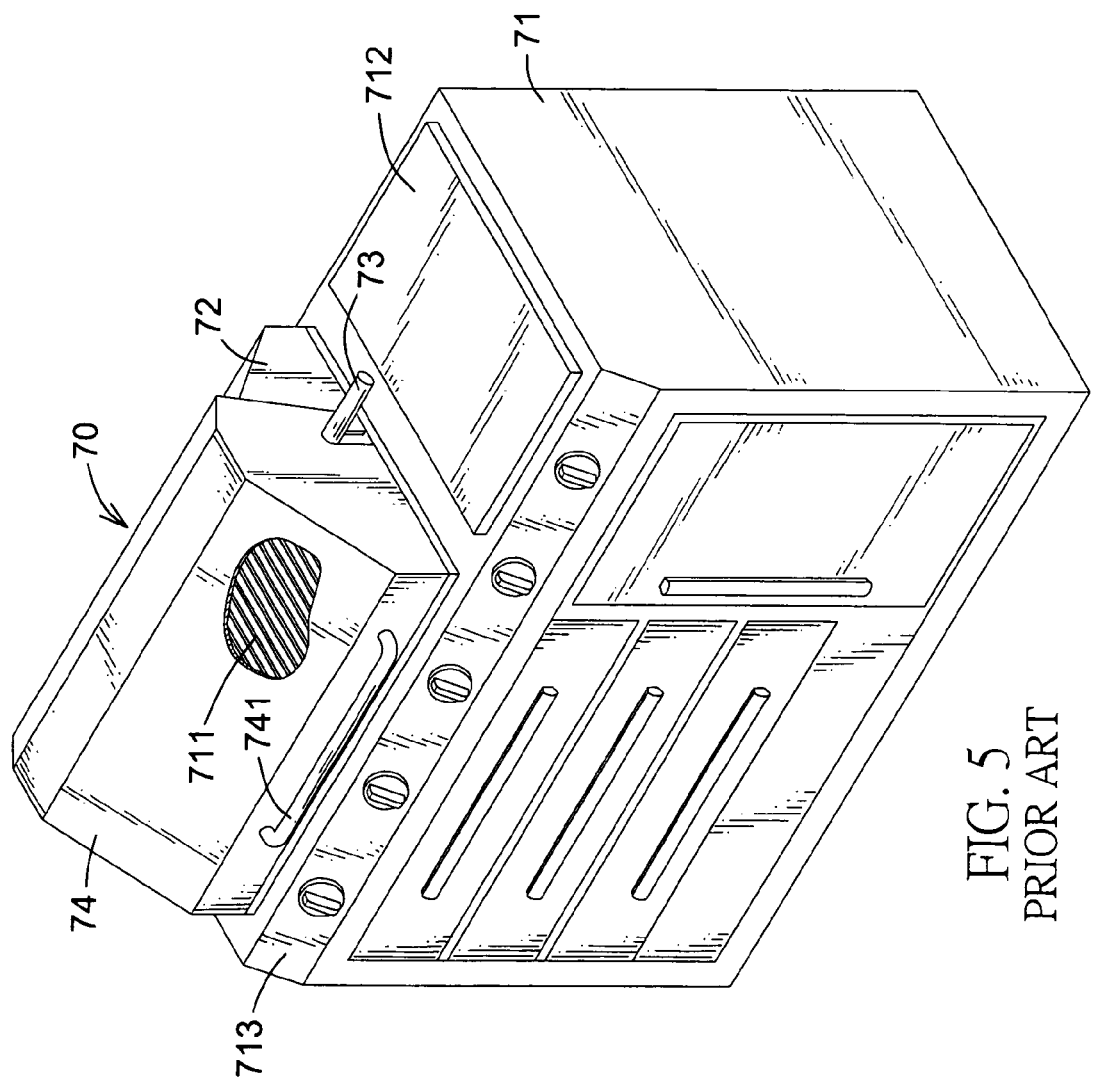
FIG. 5 is a perspective view of a conventional barbecue grill in accordance with the prior art.

With reference to FIGS. 1 and 2, a barbecue grill (10) in accordance with the present invention comprises a grill body (20), two hinge plates (30), a rear cover (40), a front cover (50) and multiple holding pins (60).

The grill body (20) has a top, a front, a rear, a burner (21), multiple mounting holes (24), an optional grill (22) and a control panel (23). The burner (21) is mounted in the top of the grill body (20) and has two sides. The mounting holes (24) are formed in the top of the grill body (20) near the sides of the burner (21). The grill (22) is mounted on the top of the grill body (20) beside the burner (21). The control panel (23) is mounted on the front of the grill body (20) adjacent to the top and controls the burner (21) and the grill (22).

The hinge plates (30) are mounted on the grill body (20) adjacent respectively to the sides of the burner (21) and face each other, and each hinge plate (30) has a mounting foot (31) and a mounting and adjustment panel (32). Each mounting foot (31) is attached to the top of the grill body (20) and has two through holes and multiple fasteners. The through holes are formed in the mounting foot (31) and correspond to the mounting holes (24) in the grill body (20). The fasteners extend respectively through the through holes in the mounting feet (31) and are connected respectively to the mounting holes (24) in the top of the grill body (20) to attach the hinge plates (30) to the top of the grill body (20). Each mounting and adjustment panel (32) is semicircular and is formed with and extends perpendicular up from the corresponding mounting foot (31) and has a center, a semicircular edge, a pivot hole (321) and multiple adjusting holes (322). The pivot hole (321) is formed through the center of the mounting and adjustment panel (32). The adjusting holes (322) are formed through the mounting and adjustment panel (32) near the semicircular edge.

The rear cover (40) is connected pivotally to the hinge plates (30) over the burner (21) and has a curved panel (41), two side panels (42) and two pivot pins (43). The curved panel (41) has two curved ends. The side panels (42) are connected respectively to the curved ends of the curved panel (41), and each side panel (42) has a center of curvature and multiple positioning holes (421). The positioning holes (421) are formed through the side panels (42) and correspond to and selectively align with the adjusting holes (322) in the mounting and adjustment panels (32). The pivot pins (43) are connected respectively to and protrude out from the centers of curvature of the side panels (42) and are pivotally mounted respectively through the pivot holes (321) in the mounting and adjustment panels (32) to allow the rear cover (40) to pivot over the burner (21).

The front cover (50) is connected pivotally around the rear cover (40) and over the burner (21) and has a curved panel (51), two side panels (52) and two pivot collars (53). The curved panel (51) is larger than the curved panel (41) of the rear cover (40) and has two curved ends, a front edge and an optional handle (511). The handle (511) is mounted on the curved panel (51) near the front edge. The side panels (52) are connected respectively to the curved ends of the curved panel (51), and each side panels (52) has a center of curvature and multiple positioning holes (521). The positioning holes (521) are formed through the side panels (52) and correspond to and selectively align with the positioning holes (421) in the side panels (42) of the rear cover (40) and the adjusting holes (322) in the mounting and adjustment panels (32). The pivot collars (53) are connected respectively to and protrude out from the centers curvature of the side panels (52) and are rotatably mounted respectively around the pivot pins (43) between the mounting and adjustment panels (32) and the side panels (42) of the rear cover (40) to allow the front cover (50) to pivot over the burner (21).

The holding pins (60) are mounted through the adjusting holes (322) in the mounting and adjustment panel (32) and the positioning holes (521, 421) in the front cover (50) and the rear cover (40) to hold the front cover (50) and the rear cover (40) securely in position over the burner (21). With further reference to FIG. 3, removing the holding pins (60) from the positioning holes (421) in the rear cover (40) allows the rear cover (40) to be pivoted toward the front of the grill body (20). With further reference to FIG. 4, removing the holding pins (60) from the positioning holes (521) in the front cover (50) allows the front cover (50) to be pivoted toward the rear of the grill body (20). Consequently, a person can tend food from the front or rear of the grill body (20) or both.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A barbecue grill having
   a grill body (20) having
      a top;
      a front;
      a rear;
      a burner (21) mounted in the top of the grill body (20) and has two sides;
      multiple mounting holes (24) formed in the top of the grill body (20) near the sides of the burner (21); and
      a control panel (23) mounted on the front of the grill body (20) adjacent to the top to control the burner (21);
   two hinge plates (30) mounted on the grill body (20) adjacent respectively to the sides of the burner (21) and facing each other, and each hinge plate (30) having
      a mounting foot (31) attached to the top of the grill body (20) and having
         multiple through holes formed in the mounting foot (31) and corresponding to the mounting holes (24) in the grill body (20) near a corresponding side of the burner (21); and
         multiple fasteners extending respectively through the through holes in the mounting feet (31) and connected respectively to corresponding mounting holes (24) in the top of the grill body (20) to attach the hinge plate (30) to the top of the grill body (20); and
      a mounting and adjustment panel (32) being semicircular and formed with and extending perpendicular up from the mounting foot (31) and having
         a center;
         a semicircular edge;
         a pivot hole (321) formed through the center of the mounting and adjustment panel (32); and
         multiple adjusting holes (322) formed through the mounting and adjustment panel (32) near the semicircular edge;
   a rear cover (40) connected pivotally to the hinge plates (30) over the burner (21) and having
      a curved panel (41) having two curved ends;
      two side panels (42) connected respectively to the curved ends of the curved panel (41), and each side panel (42) having
         a center of curvature; and
         multiple positioning holes (421) formed through the side panel (42) and corresponding to and selectively aligning with the adjusting holes (322) in the mounting and adjustment panel (32) of a corresponding hinge plate (30); and
      two pivot pins (43) connected respectively to and protruding out from the centers of curvature of the side panels (42) and pivotally mounted respectively through the pivot holes (322) in the mounting and adjustment panels (32);
   a front cover (50) connected pivotally around the rear cover (40) and over the burner (21) and having
      a curved panel (51) being larger than the curved panel (41) of the rear cover and having
         two curved ends; and
         a front edge;
      two side panels (52) connected respectively to the curved ends of the curved panel (51), and each side panels (52) having
         a center of curvature; and
         multiple positioning holes (521) formed through the side panels (52) and corresponding to and selectively aligning with the positioning holes (421) in a corresponding side panel (42) of the rear cover and the adjusting holes (322) in the mounting and adjustment panel (32) of a corresponding hinge plate (30); and
      two pivot collars (53) connected respectively to and protruded out from the centers of curvature of the side panels (52) and rotatably mounted respectively around the pivot pins (43) between the mounting and adjustment panels (32) and the side panels (42) of the rear cover (40); and
   multiple holding pins (60) mounted through the adjusting holes (322) in the mounting and adjustment panel (32) and the positioning holes (521, 421) in the front cover (50) and the rear cover (40).

2. The barbecue grill as claimed in claim 1, wherein the grill body (20) further has a grill (22) mounted on the top of the grill body (20) beside the burner (21).

3. The barbecue grill as claimed in claim 2, wherein the curved panel (51) of the front cover (50) further has a handle (511) mounted on the curved panel (51) near the front edge.

4. The barbecue grill as claimed in claim 1, wherein the curved panel (51) of the front cover (50) further has a handle (511) mounted on the curved panel (51) near the front edge.

* * * * *